(12) United States Patent
Daum et al.

(10) Patent No.: US 8,668,488 B2
(45) Date of Patent: Mar. 11, 2014

(54) PROCESS FOR THE COMBUSTION OF A LIQUID

(75) Inventors: Karl-Heinz Daum, Mainz (DE); Wolfram Schalk, Bad Homburg (DE); Jean Claude Hein, Niddatal (DE); Thomas Schueller, Alzenau (DE); Ludwig Emich, Frankfurt (DE); Bernhard Rieger, Stuhr (DE); Dieter Sterner, Ritterhude (DE); Johann-Peter Arning, Bremen (DE)

(73) Assignees: Outotec Oyj, Espoo (FI); Saacke GmbH, Bremen (DE)

( * ) Notice: Subject to any disclaimer, the term of this patent is extended or adjusted under 35 U.S.C. 154(b) by 0 days.

(21) Appl. No.: 13/878,575

(22) PCT Filed: Oct. 7, 2011

(86) PCT No.: PCT/EP2011/067606
§ 371 (c)(1), (2), (4) Date: May 13, 2013

(87) PCT Pub. No.: WO2012/049100
PCT Pub. Date: Apr. 19, 2012

(65) Prior Publication Data
US 2014/0004034 A1    Jan. 2, 2014

(30) Foreign Application Priority Data
Oct. 11, 2010 (DE) .................. 10 2010 047 895

(51) Int. Cl.
*B05B 3/10* (2006.01)
*C01B 17/54* (2006.01)
*F23C 99/00* (2006.01)
*F23D 11/04* (2006.01)

(52) U.S. Cl.
USPC .................. 431/2; 431/8; 423/539; 423/543; 239/7; 239/214; 239/223; 239/225.1; 239/463

(58) Field of Classification Search
USPC .............. 431/2, 8; 423/539, 543; 239/7, 214, 239/223, 225.1, 463
See application file for complete search history.

(56) References Cited

U.S. PATENT DOCUMENTS

| 256,086 A | 4/1882 | Wells |
|---|---|---|
| 2,998,230 A | 8/1961 | Perretti |

(Continued)

FOREIGN PATENT DOCUMENTS

| DE | 2 14 911 A1 | 10/1984 |
|---|---|---|
| WO | 94 10502 A1 | 5/1994 |

OTHER PUBLICATIONS

"Winnacker/Küchler. Chemische Technik: Prozesse und Produkte" Roland Dittmeyer, Wilhelm Keim, Gerhard Kreysa, Alfred Oberholz, Band 3, Weinheim, 2005, p. 37 et seq.

Primary Examiner — Timothy Vanoy
(74) Attorney, Agent, or Firm — Leydig, Voit & Mayer, Ltd.

(57) ABSTRACT

A process for the combustion of a liquid in a combustion chamber includes atomizing liquid sulfur using a rotary atomizer and introducing the liquid sulfur into the combustion chamber. The liquid sulfur is charged onto an inside of a cup. The cup is rotated so as to form a liquid film on the inside of the cup and so that parts of the liquid film are radially flung off from an edge of the cup edge into the combustion chamber. The rotational speed of the cup is varied so as to control a thickness of the liquid film in the cup to between 200 and 1000 μm. The liquid sulfur is evaporated and subsequently burnt in the combustion chamber.

9 Claims, 5 Drawing Sheets

(56) References Cited

U.S. PATENT DOCUMENTS

| | | |
|---|---|---|
| 3,933,133 A | 1/1976 | Shekleton |
| 4,343,147 A | 8/1982 | Shekleton |
| 4,584,000 A * | 4/1986 | Guest .................................. 95/36 |
| 4,726,342 A | 2/1988 | Diener |
| 7,674,449 B2 | 3/2010 | Randolph, III et al. |

* cited by examiner

PROCESS FOR THE COMBUSTION OF A LIQUID

CROSS-REFERENCE TO RELATED APPLICATIONS

This application is a U.S. national phase application under 35 U.S.C. §371 of International Application No. PCT/EP2011/067606 filed on Oct. 7, 2011 and claims benefit to German Patent Application No. DE 10 2010 047 895.4, filed on Oct. 11, 2010. The international application was published in English on Apr. 19, 2012, as WO 2012/049100 A1 under PCT Article 21(2).

FIELD

The present invention relates to a process for the combustion of a liquid, wherein the liquid is atomized by means of a rotary atomizer and introduced into a combustion chamber, where it is evaporated and subsequently burnt, wherein the liquid is charged onto the inside of a cup and due to the rotation of the cup a liquid film is formed on its inside, and wherein parts of the liquid film are radially flung off from the cup edge into the combustion chamber.

BACKGROUND

In the production of sulfuric acid atomic sulfur is burnt, whereby sulfur dioxide is formed. This sulfur dioxide then is catalytically converted to sulfur trioxide, which by absorption with sulfuric acid itself can be converted into sulfuric acid.

To achieve a yield of sulfur dioxide ($SO_2$) as complete as possible, an atomization of the sulfur as fine as possible and an intermixture with the combustion air as good as possible must be achieved in the burner, in order to achieve a combustion as complete as possible by the shortest route. Suitable burners are described for example in "*Winnacker/Küchler. Chemische Technik: Prozesse and Produkte*", edited by Roland Dittmeyer, Wilhelm Keim, Gerhard Kreysa, Alfred Oberholz, Vol. 3, Weinheim, 2005, pp. 37 ff.

To produce an extremely fine distribution of the sulfur, one possibilty consists in blowing the same into the combustion chamber under pressure. Such pressure atomizers also can be designed as binary burners and include a nozzle for the sulfur with a jacket for steam and compressed air to support the atomization. The use of steam has the advantage that the sulfur is maintained at an optimum operating temperature, but at the same time involves the risk that in the case of a leakage water can enter into the system. For a complete combustion of the sulfur, the pressure atomizers (also called "Sulfur Guns") require a relatively long combustion chamber due to a large combustion flame.

The performance of a nozzle only can be varied in a range from 70 to 100% based on the full load of this nozzle. To be able to operate the plant with different mass flows, it is not possible to feed different mass flows into the individual burner, but rather a plurality of individual burners are connected in parallel. In the case of a partial load operation (weak load operation; below the full load operation) not all burners are used. Another possibility is to provide nozzles of different sizes in a plant, which are exchanged during standstill of the plant. The size of the individual nozzles then is adapted to the respective mass flow.

Furthermore, ultrasonic sulfur burners are used, which are based on the action principle of a gas-operated acoustic oscillator. This oscillator generates a field with high-frequency acoustic waves in a range between 18,000 and 23,000 Hz. When the liquid sulfur passes this field, very small droplets with a diameter between 20 and 160 μm are formed. This process requires sulfur with a feed pressure of about 1 bar above combustion chamber pressure and in addition a very dry gas as propagation medium for the acoustic waves, which must be under a pressure of 2 to 3 bar above combustion chamber pressure. The use of the dry air makes this process very expensive, as about 1,000 $Nm^3$ of dried air cost EUR 120.00 and per ton of sulfur to be converted about 100 $Nm^3$ of air are required.

The rotary atomizer "Luro" is based on a rotating cup into which liquid sulfur is charged. Due to the centrifugal force, a uniform liquid film is formed on the inside of the cup during the rotation. At the cup edge, this liquid film is flung off radially into the combustion chamber and thus is uniformly and very finely distributed, which provides for a very fast evaporation. Due to the fine distribution a short flame of the burner is obtained with a complete combustion, which leads to gases with up to 18 to 19 vol-% $SO_2$. In particular in plants with small capacity gases with about 11.5 vol-% $SO_2$ are employed. The furnace length can be reduced down to 50% of the length required for pressure atomizers and allows an extremely high combustion chamber load of up to 8 GJ $M^{-3}$. The short, hot flame also leads to lower $NO_x$ contents of the waste gas produced. So far, load ranges between 40 and 100% based on the full load range can be run with the Luro burner during ongoing operation.

Especially in times of greatly fluctuating raw material prices, plants often are operated for a short time with distinctly reduced utilization. As the Luro burner is distinctly more complex in its design than a simple pressure atomizer, it cannot simply be replaced by a model which is designed for smaller mass flows.

Furthermore, starting up a plant is facilitated when initially only very small mass flows can be introduced in relation to the full load.

SUMMARY

In an embodiment, the present invention provides a process for the combustion of a liquid in a combustion chamber including atomizing liquid sulfur using a rotary atomizer and introducing the liquid sulfur into the combustion chamber. The liquid sulfur is charged onto an inside of a cup. The cup is rotated so as to form a liquid film on the inside of the cup and so that parts of the liquid film are radially flung off from an edge of the cup edge into the combustion chamber. The rotational speed of the cup is varied so as to control a thickness of the liquid film in the cup to between 200 and 1000 μm. The liquid sulfur is evaporated and subsequently burnt in the combustion chamber.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Therefore, in an embodiment, the present invention provides a process with which all load ranges between 10 and 100% based on the full load operation can be covered in a stepless manner with a single rotary atomizer.

In accordance with an embodiment of the invention, it was determined that the thickness of the liquid film in the cup is decisive for a uniform tear-off at the cup edge and thus for a fast and complete extremely fine distribution in the combustion chamber. This thickness of the liquid film must therefore be adjusted to a range between 200 and 1000 μm.

Particularly advantageously, the thickness of the liquid film is adjusted to a range between 350 and 500 μm. With such a thickness of the liquid film, non-uniformities in the combustion flame can also be compensated.

This process is equally suitable for introducing liquid sulfur and/or liquid hydrocarbons into the furnace in very finely distributed form. Introducing hydrocarbons for heating up the furnace likewise must be effected in a very fine distribution, as otherwise droplets can form in the porous wall of the furnace shell. When reaching higher temperatures, these droplets can expand or ignite in an explosion-like manner, which in any case leads to a damage of the furnace wall. When using liquid hydrocarbons as liquid, it can be ensured by using the burner with the process according to an embodiment of the invention that despite the furnace radiation with a temperature of up to more than 1200° C. the hydrocarbons are not cracked. This will also prevent the risk of tar formation.

However, if sulfur is used as liquid, it is also necessary to operate in a narrow temperature range. Sulfur only becomes liquid at 115° C. In particular when using primary air in the rotary atomizer, the temperature can fall below this temperature, so that solid precipitations and agglutinations can occur. On the other hand, if the sulfur is heated to a temperature of more than 160° C., the viscosity of the sulfur changes abruptly and the liquid becomes tough, which likewise makes a fine distribution in the combustion chamber impossible.

It turned out to be particularly practical to drive the cup by means of a motor, preferably an electric motor.

For controlling the motor, which directly acts on the control of the cup speed, at least one characteristic data field can be stored in the controller of the motor, in which the thickness of the liquid film formed is stored in relation to the mass flow of the liquid and the rotational speed of the cup. A relation between mass flow of the liquid and rotational speed of the cup is generated therefrom. As the mass flow is already known as fixed quantity from the central plant controller, the required speed can directly be determined and automatically be adjusted for each mass flow by means of the characteristic data field.

The characteristic data field can either be generated in that the volume present in the cup is calculated from the introduced mass flow and related to the surface to be wetted. However, such theoretical calculation requires assumptions on the mass flow discharged and therefore is only very difficult to transfer to a dynamic process, such as the slow starting up of the plant.

Furthermore, it is possible to operate the cup with a fixed mass flow at different rotational speeds or to vary the mass flow at a certain number of revolutions and in addition each calculate the layer thickness. This results in a matrix in which it can be localized at which mass flow what speed range is possible or at which rotational speed what mass flows can be fed into the rotary atomizer, so that the layer thickness lies within the required range.

A tear-off at the cup edge in particular is effected in a uniform manner, when this cup is formed slightly conical.

In addition it turned out to be favorable to let primary air flow in through a narrow annular gap between the rotating cup and a hood of the cup, whereby it is prevented that unburnt sulfur gets at the combustion chamber wall and very fine droplets are formed there.

The main air quantity necessary for the complete combustion can favorably be introduced through a windbox preferably arranged in the combustion chamber head.

It is particularly favorable when this combustion air is at least partly introduced rotating with equal or counter-spin relative to the direction of rotation of the cup. Such movement of the air quantity can be generated e.g. by swirl vanes. It is particularly advantageous to move the introduced sulfur with counter-spin and hydrocarbons with equal spin.

The combustion chamber preferably is operated with a gas-side pressure of not more than 1 bar above combustion chamber pressure, preferably 0.3 to 0.5 bar above combustion chamber pressure. The combustion chamber temperature is at least 600° C., in normal operation between 1150 and 1750° C., which has the advantage that the combustion chamber can be operated at temperatures at which no significant $NO_x$ formation is effected yet.

Figure 1:
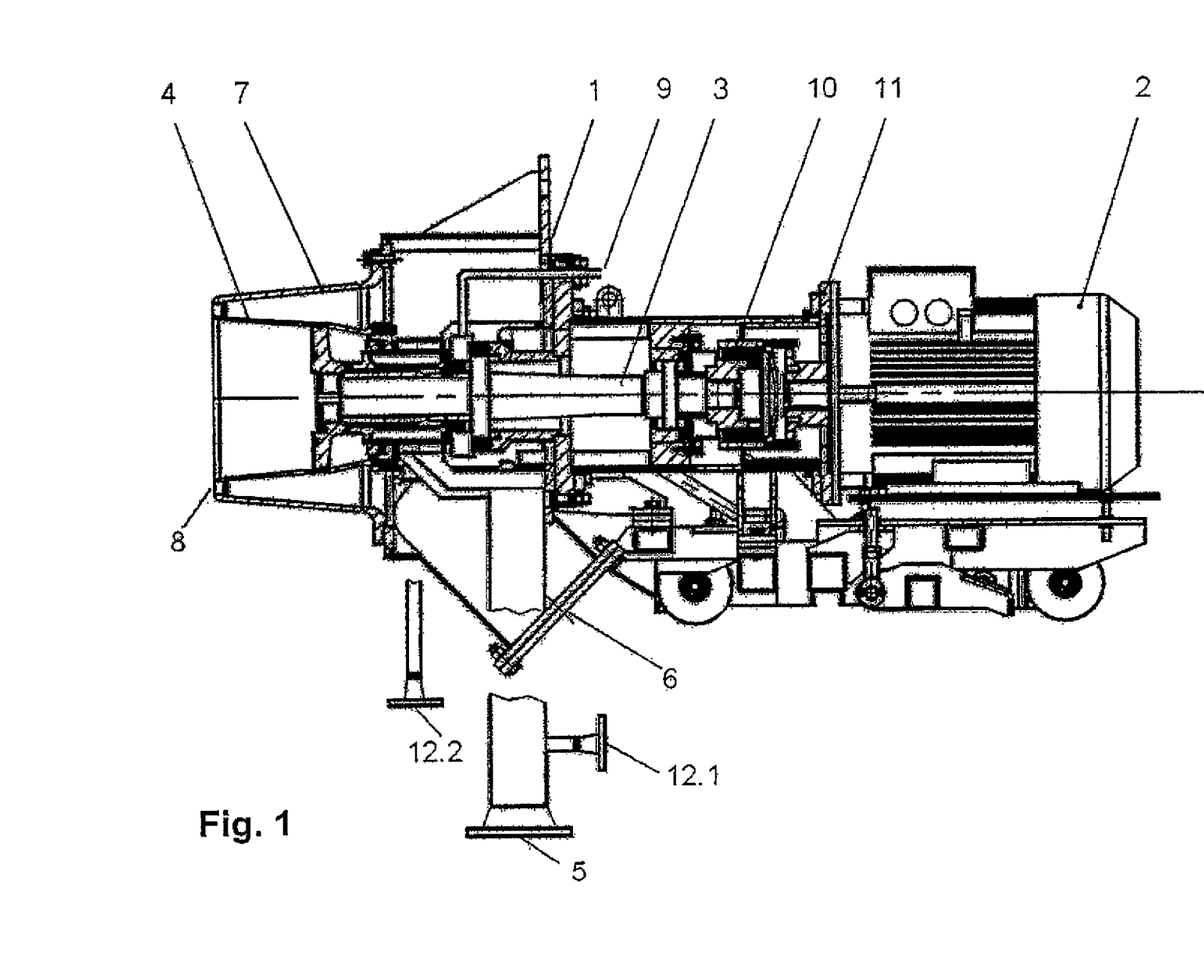
FIG. 1 schematically shows a rotary atomizer for burning liquids.

FIG. 1 schematically shows a rotary atomizer 1 for burning liquid. Via the motor 2 and the shaft 3 the cup 4 is moved circularly. The cup 4 can be designed slightly conical. The motor 2 acting as drive source preferably is a three-phase AC motor, as here the control of the speed is particularly easy. So far, the atomizer cup 4 is constantly operated at about 5,000 revolutions per minute.

The liquid, preferably sulfur and/or liquid hydrocarbons, is charged to the inside of the cup via conduit 5. Due to the centrifugal force, a uniform liquid film is formed in the cup 4 on its inner surface. In a radial movement this liquid film is flung from the cup edge into the combustion chamber, where it is very finely distributed and then evaporated. To optimize this distribution, primary air is introduced via conduit 6 and flows out from a narrow gap 8 between cup 4 and primary air hood 7. At the same time, it can thus be prevented that unburnt sulfur gets at the combustion chamber brick lining and very fine droplets will condense there.

The main air quantity required for a complete combustion flows through a non-illustrated windbox preferably arranged in the combustion chamber head, wherein e.g. swirl vanes can put this secondary air into a rotatory movement, which is in equal or counter-spin relative to the rotary movement of the liquid stripped off from the cup edge.

Via conduit 9, sealing air is introduced into the rotary atomizer 1, in order to prevent the entry of process gas into the motor 2. A magnetic clutch 10 connects the non-illustrated drive shaft of the motor 2 with the burner shaft 3. The atomizer and the motor 2 are connected via a flange connection.

Via a port 12.1 heating steam can be introduced into the rotary atomizer 1 and via the port 12.2 the condensate resulting therefrom can again be withdrawn. The fluid inlet 5 thus can be heated, whereby in particular when using sulfur a solidification can be prevented.

Figure 2:
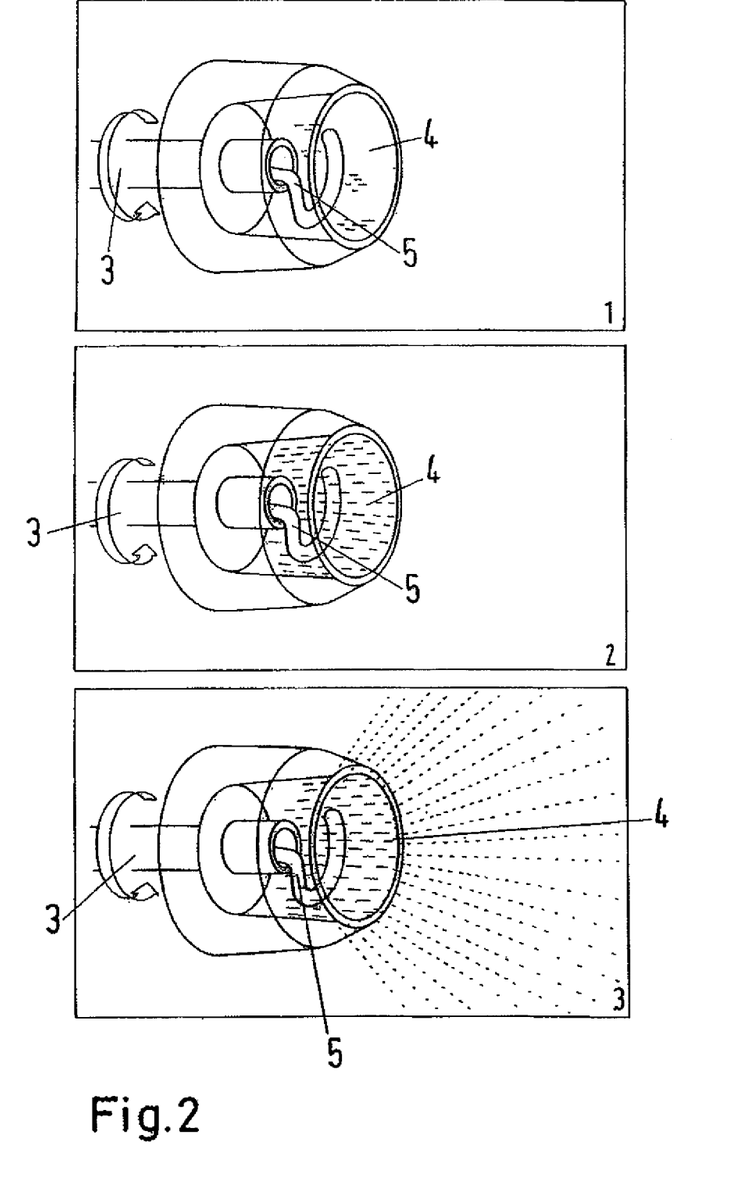
FIG. 2 shows the schematic procedure of the film formation in the cup of the rotary atomizer.

FIG. 2 shows the formation of the liquid film and the extremely fine distribution achieved thereby. In image 1 of FIG. 2 it is shown how the fuel gets into the cup 4 through conduit 5. Due to the rotation of the cup 4, the fluid is circularly distributed on the inner surface of the cup.

Image 2 shows how a uniform liquid film thus spreads on the entire inner surface of the cup 4.

Image 3 finally shows the rotary atomizer 1 in the continuous operation. At the edge of the cup a tear-off of the liquid film occurs, which thus is introduced into the surroundings in very finely atomized form. In the same quantity, new liquid is introduced into the cup via conduit 5.

Figure 3:
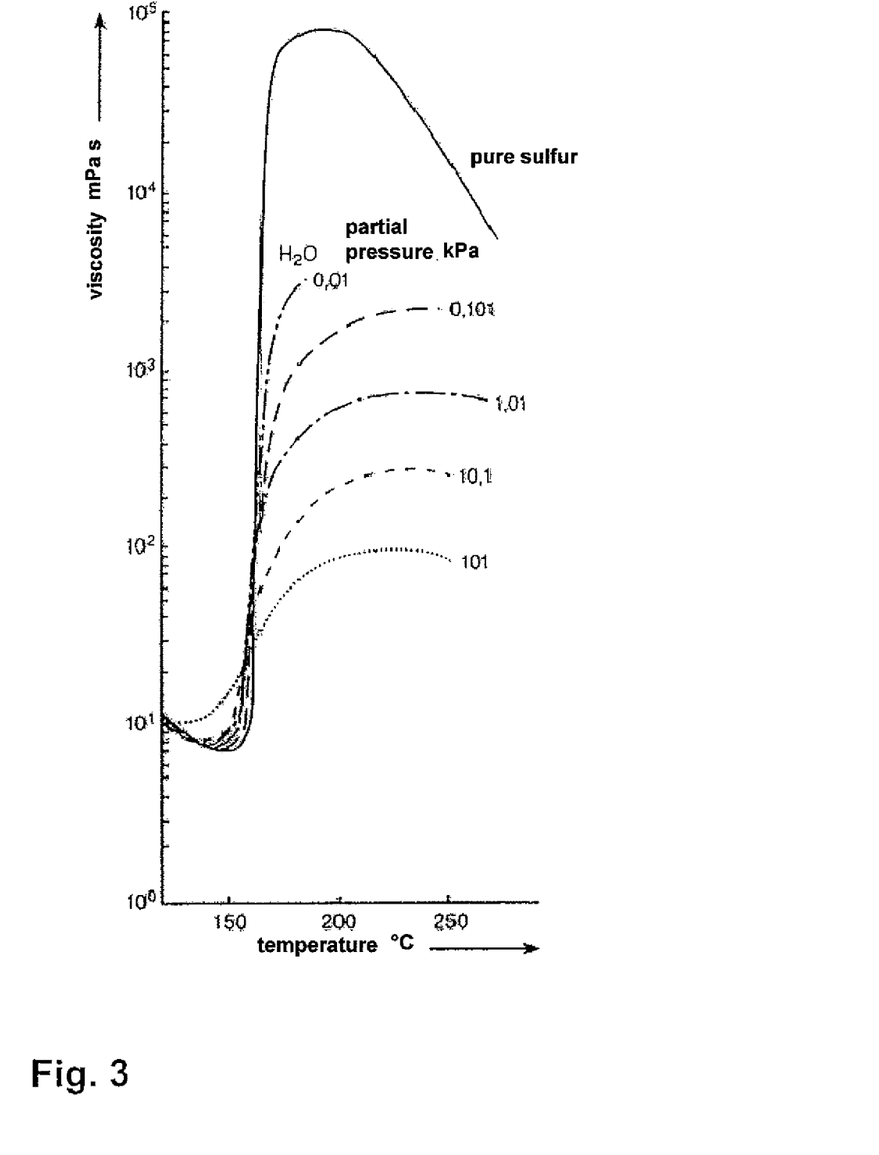
FIG. 3 shows the viscosity profile of sulfur in dependence on the temperature.

FIG. 3 again clearly shows why only a very narrow temperature range can be employed for sulfur. As sulfur is liquefied at 115° C., the representation of the viscosity profile starts at this temperature. It can clearly be seen that at a temperature of about 160° C. the viscosity increases abruptly and thereafter only slowly decreases again. From about 190° C. the liquid sulfur becomes tacky. By increasing the partial pressure of water this viscosity profile can be changed to the effect that the viscosity remains smaller. The combustion of sulfur can, however, be operated with dry air only and without the presence of water, as steam in the gas generated would disturb the subsequent catalysis of $SO_2$ to obtain $SO_3$.

EXAMPLE

Tables 1 and 2 show data for the conventional operation of a rotary atomizer.

TABLE 1

Data of the rotary atomizer for sulfur operation.

| Designation | Value | Unit |
| --- | --- | --- |
| Temperature (sulfur) | 145 | ° C. |
| volumetric flow rate (sulfur) | 4.0 | mm³/s |
| Density | 1788.0 | kg/m⁻³ |
| D_a (outside diameter of the cup) | 221.6 | mm |
| α (cone angle of the cup) | 5.0 | ° |

TABLE 2

Operating data of two sulfur combustion plants

| Designation | Plant 1 | Plant 2 | Unit |
| --- | --- | --- | --- |
| Type of cup | D230 | D200 | |
| Mass flow | 23.0 | 10.9 | t h⁻¹ |
| Film thickness | 338.9 | 303.5 | μm |
| Energy consumption | 13 | 4.2 | kW |

In Table 3, data for three different rotational speeds are listed, namely 1600 rpm, 2000 rpm and 5200 rpm (revolutions per minute). The mass flow is varied between 3 and 23 t h⁻¹. The normal load of the plant is about 23 t h⁻¹, wherein the plant can also be operated at a reduced load of ≤3 t h⁻¹.

TABLE 3

Exemplary data records of a characteristic data field

| | Sulfur [t h⁻¹] | Revolution [rpm] | Liquid layer thickness [μm] |
| --- | --- | --- | --- |
| Full load operation | 23 | 5200 | 330 (admissible) |
| Partial load operation | 3 | 5200 | 141 (inadmissible) |
| Partial load operation | 3 | 2000 | 270 (admissible) |
| Partial load operation | 3 | 1600 | 315 (admissible) |

Figure 4:
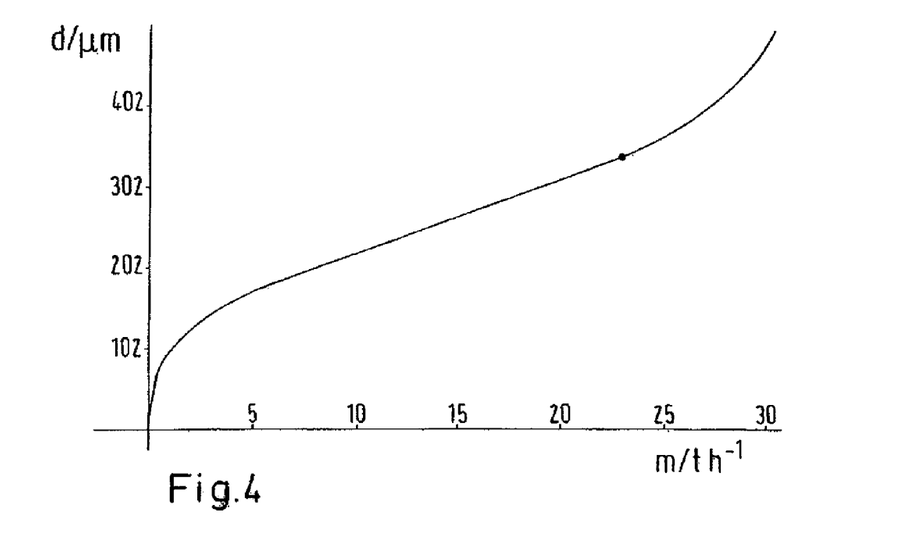
FIG. 4 shows the film thickness in dependence on the mass flow with the data of Example 1.

FIG. 4 shows the course of the thickness of the liquid film formed in dependence on the magnitude of the mass flow introduced at a rotational speed of 5200 rpm, wherein the thickness of the liquid film is indicated in the full load operation.

Figure 5:
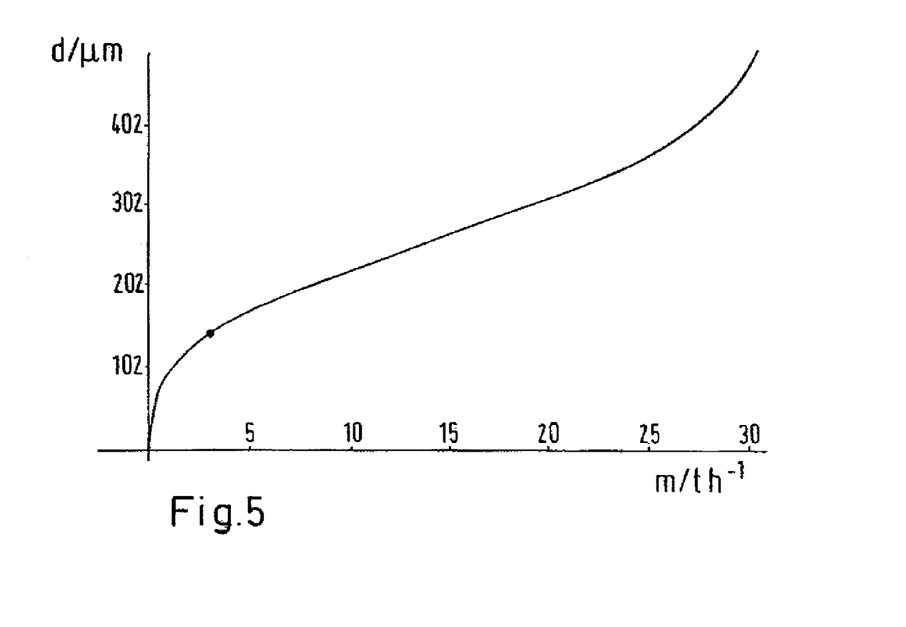
FIG. 5 shows the film thickness in dependence on the mass flow with the data of Example 2.

FIG. 5 likewise shows the liquid film thickness in dependence on the mass flow at a rotational speed of 5200 rpm, wherein the thickness of the liquid film, however, is indicated in the partial load operation (3 t h⁻¹).

Figure 6:
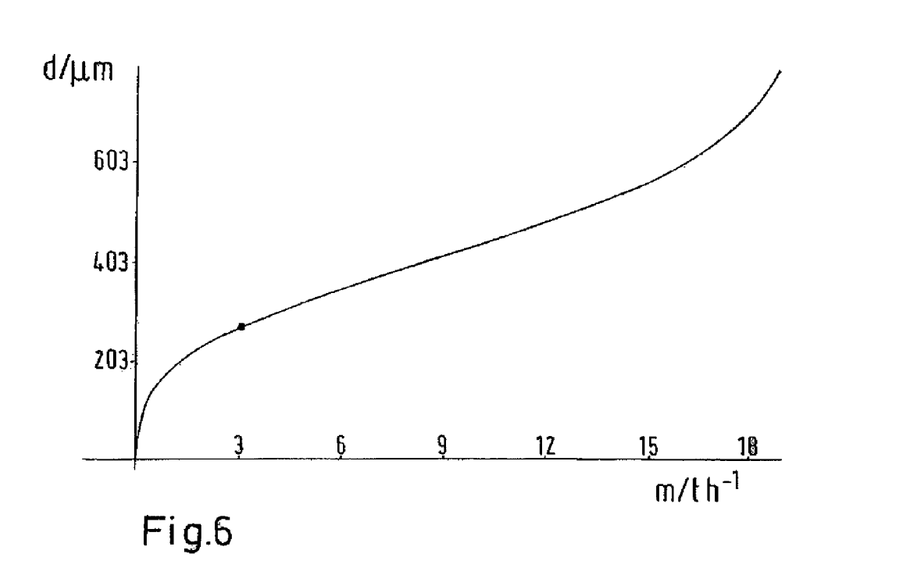
FIG. 6 shows the film thickness in dependence on the mass flow with the data of Example 3.

FIG. 6 shows the course of the thickness of the liquid film in dependence on the mass flow introduced at a rotational speed of 2000 rpm. The film thickness in partial load operation (3 t h⁻¹) is indicated.

Figure 7:
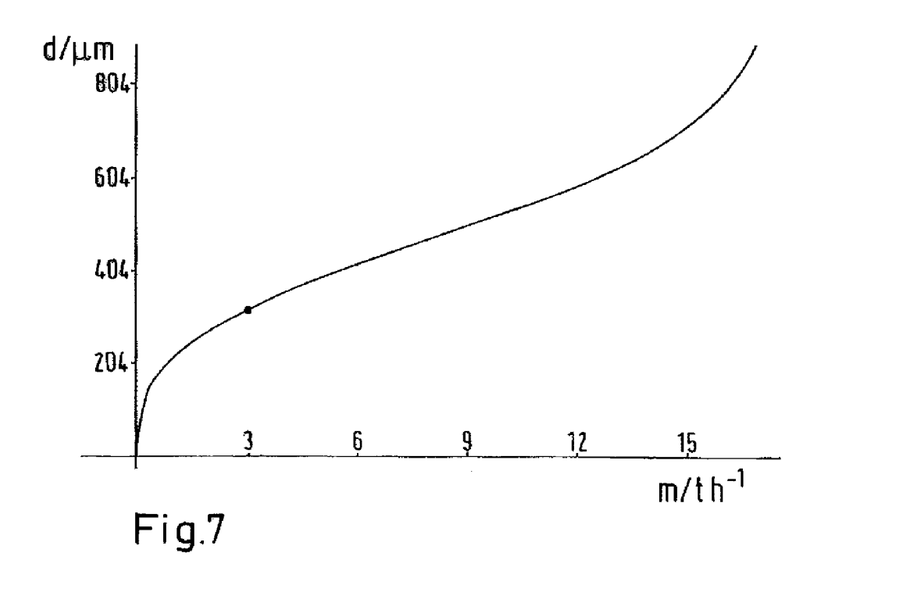
FIG. 7 shows the film thickness in dependence on the mass flow with the data of Example 4.

FIG. 7 shows the course of the liquid film thickness in the cup in dependence on the mass flow at a rotational speed of 1600 rpm. The layer thickness in partial load operation (3 t h⁻¹) is indicated.

From a multitude of calculations, as they are shown in FIGS. 4 to 7 by way of example, a complete characteristic data field can then be generated. Again, this results in correlations between the mass flow and the rotational speed. For this multitude of data points Table 3 only shows the four data records which correlate with those from FIGS. 4 to 7. With reference to the value of the liquid film thickness belonging to the value pair mass flow/rotational speed a simple evaluation is possible as to whether such adjustment is admissible or whether with these parameters a liquid film thickness is obtained, at which a uniform film thickness no longer can be ensured. In this case, mass flow or revolution must be corrected such that an admissible liquid film thickness again is obtained.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

LIST OF REFERENCE NUMERALS

1 rotary atomizer
2 motor
3 shaft
4 cup
5 inlet liquid
6 inlet primary air
7 primary air hood
8 primary air gap
9 inlet sealing air
10 magnetic clutch 11 flange connection
12.1 inlet heating steam
12.2 outlet condensate

The invention claimed is:

1. A process for the combustion of a liquid in a combustion chamber, the process comprising:
atomizing liquid sulfur using a rotary atomizer;
introducing the liquid sulfur into the combustion chamber, the liquid sulfur being charged onto an inside of a cup, the cup being rotated so as to form a liquid film on the inside of the cup and so that parts of the liquid film are radially flung off from an edge of the cup edge into the combustion chamber;
varying the rotational speed of the cup so as to control a thickness of the liquid film in the cup to between 200 and 1000 µm; and
evaporating and subsequently burning the liquid sulfur in the combustion chamber.

2. The process according to claim 1, wherein the varying step is performed so as to adjust the thickness of the liquid film between 350 and 500 µm.

3. The process according to claim 1, wherein the cup is driven using a motor.

4. The process according to claim 3, wherein the motor is controlled based on at least one characteristic data field for a relation between mass flow of the liquid sulfur and rotational speed of the cup.

5. The process according to claim 1, wherein the liquid sulfur is applied onto the inside of the cup, wherein the cup is conically-shaped.

6. The process according to claim 1, further comprising introducing primary air through an annular gap between the rotating cup and a hood of the cup.

7. The process according to claim 1, further comprising introducing combustion air into the combustion chamber through a windbox.

8. The process according to claim 7, wherein the introducing the combustion air step is performed so as to at least partly introduce the combustion air rotating with equal or counter-spin relative to a direction of rotation of the cup.

9. The process according to claim 1, further comprising operating the combustion chamber with a gas-side pressure of not more than 1 bar above combustion chamber pressure and a temperature of at least 600° C.

* * * * *